US012809750B2

(12) United States Patent
La Rosa et al.

(10) Patent No.: US 12,809,750 B2
(45) Date of Patent: Nov. 24, 2026

(54) TECHNIQUE FOR ADAPTING TELEMETRY SETTINGS IN A CLOUD COMPUTING ENVIRONMENT

(71) Applicant: Telefonaktiebolaget LM Ericsson (publ), Stockholm (SE)

(72) Inventors: Massimo La Rosa, Genoa (IT); Riccardo Pirastru, Chiavari (IT)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 50 days.

(21) Appl. No.: 18/700,012

(22) PCT Filed: Oct. 13, 2021

(86) PCT No.: PCT/EP2021/078307

§ 371 (c)(1),
(2) Date: Apr. 10, 2024

(87) PCT Pub. No.: WO2023/061574

PCT Pub. Date: Apr. 20, 2023

(65) Prior Publication Data

US 2024/0338298 A1 Oct. 10, 2024

(51) Int. Cl.
*G06F 11/362* (2025.01)

(52) U.S. Cl.
CPC ................................ *G06F 11/3644* (2013.01)

(58) Field of Classification Search
CPC ............................. H04L 69/40; G06F 11/3093
See application file for complete search history.

(56) References Cited

U.S. PATENT DOCUMENTS

2010/0174947 A1* 7/2010 Caffrey ................. G06F 11/076 714/E11.029
2016/0099849 A1* 4/2016 Batla ..................... H04L 67/535 709/203
2017/0168914 A1 6/2017 Altman et al.
2017/0337111 A1* 11/2017 Kalisch .................... H04Q 9/00
2018/0121661 A1 5/2018 Guccione et al.
2019/0193946 A1* 6/2019 DeVries ................. B65G 43/02
(Continued)

FOREIGN PATENT DOCUMENTS

EP 3171622 A1 5/2017
EP 3557895 A1 6/2022
WO 2020035150 A1 2/2020

OTHER PUBLICATIONS

EPO Communication dated Jul. 16, 2024 for Patent Application No. 20803443.9, consisting of 4 pages.
(Continued)

*Primary Examiner* — Umar Cheema
(74) *Attorney, Agent, or Firm* — Weisberg I.P. Law, P.A.

(57) ABSTRACT

A method for adapting telemetry settings in a cloud computing environment is provided. The method is carried out by a telemetry controller within the cloud computing environment. The method includes receiving information at least one misbehavior of an application component, determining, based on the received information, whether to modify a sampling frequency of telemetry data for the application component, and if it is determined to modify the sampling frequency of telemetry data for the application component, initiating modification of the sampling frequency to a modified value.

16 Claims, 6 Drawing Sheets

(56) References Cited

U.S. PATENT DOCUMENTS

| | | | | |
|---|---|---|---|---|
| 2021/0385635 | A1 | 12/2021 | Johansson et al. | |
| 2022/0350617 | A1* | 11/2022 | Hotham | G06F 9/547 |

OTHER PUBLICATIONS

Rescorla, E.; The Transport Layer Security (TLS) Protocol Version 1.3; Internet Engineering Task Force (IETF); Request for Comments: 8446; IETF Trust; Aug. 2018, consisting of 160 pages.
GSMA: SAM.01 Secured Applications for Mobile—Requirements Version 1.0; GSM Association; Jun. 8, 2021, consisting of 24 pages.
Kovacs, B. et al.; UICC Modules and the IoT; Ericsson Technology Review; Apr. 2020, consisting of 12 pages.
GSMA: SAM.01 Secured Applets for Mobile Configuration Version 1.0; Draft 8; GSM Association; Jul. 16, 2019, consisting of 18 pages.
EPO Communication dated Sep. 16, 2024 for Patent Application No. 20808320.4, consisting of 9 pages.
3GPP TR 33.899 V1.3.0; 3rd Generation Partnership Project; Technical Specification Group Services and System Aspects; Study on the security aspects of the next generation system (Release 14); Aug. 2017; consisting of 605 pages.
International Search Report and Written Opinion dated Jun. 20, 2022 for International Application No. PCT/EP2021/078307 filed Oct. 13, 2021, consisting of 12 pages.

* cited by examiner

TECHNIQUE FOR ADAPTING TELEMETRY SETTINGS IN A CLOUD COMPUTING ENVIRONMENT

CROSS-REFERENCE TO RELATED APPLICATION

This application is a Submission Under 35 U.S.C. § 371 for U.S. National Stage Patent Application of International Application Number: PCT/EP2021/078307, filed Oct. 13, 2021 entitled "TECHNIQUE FOR ADAPTING TELEMETRY SETTINGS IN A CLOUD COMPUTING ENVIRONMENT," the entirety of which is incorporated herein by reference.

The present disclosure generally relates to cloud computing. In more detail, aspects in the context of adapting telemetry settings in a cloud computing environment are presented. The technique may be implemented, e.g., in a Kubernetes cluster.

BACKGROUND

Production-grade software applications in a cloud computing environment are typically instrumented with telemetry probes allowing the collection of statistical indicators reflecting the health of the application. The granularity with which the indicators are sampled is maintained at the lowest possible sampling rate so as not to consume computational resources in excess of what is needed to maintain a significant statistical sample of the application behavior. The sampling rate is set at installation/deployment time, and may be changed through manual intervention, when needed.

Such a sampling approach is well suited for statistical monitoring of the performance of a live system in production. The sampling approach, however, is of little or no help in troubleshooting misbehaving applications, although with the same measurement approach it is possible to serve the additional purpose of gathering data for punctual troubleshooting and identification of the root cause of issues.

In view of security aspects, it is further desirable to detect misbehaviors that can potentially be caused by malicious software introducing disturbances in the system.

SUMMARY

Accordingly, there is a need for a technique, which solves at least one of the above problems or other related problems of prior art techniques. Specifically, and without limitation, there is a need for an improved technique for performing telemetry for cloud applications.

According to a first aspect, a method for adapting telemetry settings in a cloud computing environment is provided. The method is carried out by a telemetry controller within the cloud computing environment. The method comprises receiving information on at least one misbehavior of an application component, determining, based on the received information, whether to modify a sampling frequency of telemetry data for the application component, and if it is determined to modify the sampling frequency of telemetry data for the application component, initiating modification of the sampling frequency to a modified value.

The following description may apply to all aspects described in this disclosure. In particular, the following description concerning the method aspects may not only apply to the method aspects but also to the device aspects described below, where applicable.

The cloud computing environment may comprise or may be represented by a Kubernetes cluster. The cloud computing environment may comprise one or more application components, in particular, PODs. Each application component may comprise one or more containers (in particular, Docker containers). The cloud computing environment may further comprise a control plane. The control plane may supervise the one or more application components. The cloud computing environment may further comprise a telemetry subsystem configured to receive telemetry data from the one or more application components. The telemetry subsystem may be configured to store and index the received telemetry data. The cloud computing environment may further comprise a telemetry interface via which the telemetry subsystem may make the telemetry data available, e.g., to an external client.

Although the present application focuses on Kubernetes as a framework for a cloud computing environment, the present disclosure should not be understood as being limited to Kubernetes. The technique described herein may be implemented on other current or upcoming cloud computing systems and architectures.

The telemetry controller may be a logical entity in the cloud computing environment. In particular, the telemetry controller may be an application component within the cloud computing environment. The telemetry controller may be a Kubernetes POD.

Each of the aforementioned application components (in particular, the PODs and the telemetry controller) may be represented by a logical server allocated to one or more physical servers. The method is carried out by the telemetry controller and, therefore, by a logical device (i.e., a cloud entity), wherein it is not relevant for the following discussion, which physical entity carries out the method steps. In fact, the method steps may be carried out by one or more physical entities, i.e., the logical device "telemetry controller" may be allocated to one or more physical servers.

The received information on the at least one misbehavior of the application component may be received from any logical entity of the cloud computing environment, e.g., directly from the respective application component or from the control plane. The received information on at least one misbehavior of an application component may comprise, e.g., an identifier of the application component and/or further details regarding the misbehavior, such as type of the misbehavior, start time of the misbehavior, end time of the misbehavior, parts of the application component affected by the misbehavior, etc.

The step of determining may include considering information on previous misbehavior of the respective application component. The information on previous misbehavior may be stored in a storage accessible by the telemetry controller.

The step of initiating may comprise updating a configuration file of the respective application component or transmitting data to the respective application component that causes an updating of a configuration file of the application component. The modified value may be a higher value (i.e., indicating a higher sampling frequency) than a previous value for the sampling frequency.

The step of determining may comprise determining whether a frequency of misbehavior of the application component is above a predefined threshold value.

The frequency of misbehavior may be represented by a number of misbehavior in a predetermined time window. For this purpose, information on previous misbehavior may be stored in a storage accessible by the telemetry controller.

The threshold value may be represented by a number of misbehavior in the predetermined time window. The step of initiating modification may be triggered by determining that the actual number of misbehavior in the predetermined time window is above the number of misbehavior set as the threshold value.

The misbehavior of the application component may correspond to a restart of the application component.

The information on at least one misbehavior may be received from a control plane of the cloud computing environment.

The misbehaviors of the one or more application components may be monitored by the control plane. An interface may be provided between the control plane and the telemetry controller, in order to transfer the information on the at least one misbehavior to the telemetry controller.

The cloud computing environment may comprise a Kubernetes cluster.

In this regard, it has already been explained above that the cloud computing environment may comprise the typical elements of a Kubernetes cluster, such as one or more PODs, a control plane for controlling the one or more PODs, and a telemetry subsystem.

The step of initiating modification of the sampling frequency of telemetry data for the application component may comprise initiating an adaption of a value stored in a Kubernetes ConfigMap object assigned to the application component.

The initiating of the adaption of the value may comprise, e.g., sending a new value to be stored in the ConfigMap or sending an instruction to stop using a first predefined value stored in the ConfigMap and to start using a second predefined value stored in the ConfigMap. For example, the initiating of the adaption of the value may comprise initiating a change of a flag value stored in a ConfigMap assigned to the respective application component. The predefined value may define a percentage of traces to be sampled for the respective application component.

The method may further comprise, after a predefined amount of time after initiating the modification of the sampling frequency, initiating a modification of the sampling frequency back to a previous value.

The initiating the modification of the sampling frequency back to the previous value may comprise transmitting the previous value to be stored in a ConfigMap of the respective application component. Alternatively, it may comprise transmitting an instruction to stop using a second predefined value stored in a ConfigMap assigned to the respective application component and to start using a first predefined value stored in the ConfigMap. For example, the initiating the modification of the sampling frequency back to the previous value may comprise initiating a change of a flag value stored in a ConfigMap assigned to the respective application component.

The predefined threshold value may be derived from a configuration object.

The configuration object may be stored at the telemetry controller. The configuration object may be stored such that it is accessible by the telemetry controller.

The configuration object may further comprise at least one of a time value indicating a periodicity of wakeup events of a telemetry control process, a restart threshold indicating a threshold value for a number of times the application component may restart within a predefined time window without initiating modification of the sampling frequency, a value indicating a duration of the time window, a value indicating a predefined amount of time after initiating the modification of the sampling frequency before initiating a modification of the sampling frequency back to a previous value, the modified value of the sampling frequency, and a value indicating a level of logging.

The configuration object may be a Kubernetes ConfigMap object.

The telemetry controller may use at least one of the following interfaces: an interface for the receiving of the information on at least one misbehavior of the application component from a control plane of the cloud computing environment, an interface for the initiating of the modification of the sampling frequency of telemetry data for the application component, an interface for storage and retrieval of saved information of restarts and/or configuration of at least one application component, and an interface for configuration of key parameters used by the telemetry controller.

Over each of the interfaces, the telemetry controller can receive and/or transmit information from and/or to another entity of the cloud computing environment, such as a storage, an application component, or the control plane.

According to a second aspect, a method for processing telemetry data in a cloud computing environment is provided. The method comprises the method of the first aspect, carried out by a telemetry controller within the cloud computing environment. The method further comprises receiving, by a telemetry subsystem of the cloud computing environment, the telemetry data of the application component, retrieved with the modified sampling frequency, and making available, by the telemetry subsystem, the telemetry data via a telemetry interface.

While the method of the first aspect is directed to actions performed by the telemetry controller (logical entity), the method of the second aspect describes a method carried out by additional components of the cloud computing environment and/or external entities, such as the telemetry subsystem. The telemetry subsystem may be a logical device within the cloud computing environment. The telemetry data may be retrieved by the telemetry subsystem. The telemetry subsystem may store and/or further process the retrieved telemetry data. For example, the telemetry subsystem may perform additional processing steps to the telemetry data, such as statistical evaluation. The telemetry data may be made available via the telemetry interface to an external client, e.g., via a web interface.

The method of the second aspect may further comprise accessing, by an external client, the telemetry data via the telemetry interface, and determining whether the application component has suffered repeated failures.

The external client may be provided in the form of a web browser. Based on the determining, the external client may determine repeated failures caused by malevolent software that, breaching into the system, can topple over application components.

According to a third aspect, a cloud computing entity for adapting telemetry settings in a cloud computing environment is provided. The cloud computing entity hosts a telemetry controller within the cloud computing environment. The telemetry controller is configured to receive information on at least one misbehavior of an application component, determine, based on the received information, whether to modify a sampling frequency of telemetry data for the application component, and if it is determined to modify the sampling frequency of telemetry data for the application component, initiate modification of the sampling frequency to a modified value.

The method aspects discussed above with regard to the first aspect may also apply accordingly to the third aspect. As discussed above, the cloud computing entity may be represented by a logical device, e.g., a logical server. The cloud computing entity may be a distributed cloud computing entity, in particular, distributed over a plurality of physical entities, such as physical servers. The cloud computing entity may be hosted by one or more physical servers. The telemetry controller may be an application component, in particular, a Kubernetes POD.

The step of determining may comprise determining whether a frequency of misbehavior of the application component is above a predefined threshold value.

The misbehavior of the application component may correspond to a restart of the application component.

The telemetry controller may be configured to receive the information on at least one misbehavior from a control plane of the cloud computing environment.

The cloud computing environment may comprise a Kubernetes cluster.

The step of initiating modification of the sampling frequency of telemetry data for the application component may comprise initiating an adaption of a value stored in a Kubernetes ConfigMap object assigned to the application component.

The telemetry controller may be further configured to, after a predefined amount of time after initiating the modification of the sampling frequency, initiate a modification of the sampling frequency back to a previous value.

The telemetry controller may be configured to receive the predefined threshold value from a configuration object.

The configuration object may further comprise at least one of: a time value indicating a periodicity of wakeup events of a telemetry control process, a restart threshold indicating a threshold value for a number of times the application component may restart within a predefined time window without initiating modification of the sampling frequency, a value indicating a duration of the time window, a value indicating a predefined amount of time after initiating the modification of the sampling frequency before initiating a modification of the sampling frequency back to a previous value, the modified value of the sampling frequency, and a value indicating a level of logging.

The configuration object may be a Kubernetes ConfigMap object.

The telemetry controller may be configured such that it uses at least one of the following interfaces: an interface for the receiving of the information on at least one misbehavior of the application component from a control plane of the cloud computing environment, an interface for the initiating of the modification of the sampling frequency of telemetry data for the application component, an interface for storage and retrieval of saved information of restarts and/or configuration of at least one application component, and an interface for configuration of key parameters used by the telemetry controller.

According to a fourth aspect, a computer program is provided, comprising instructions which, when executed by one or more processor(s), cause the one or more processor(s) to carry out the method of the first aspect.

According to a fifth aspect, a computer-readable medium is provided, comprising instructions which, when executed by one or more processor(s), cause the one or more processor(s) to carry out the method of the first aspect.

The computer-readable medium may be a non-transitory computer-readable medium. For example, the computer-readable medium may be a solid state storage medium (e.g., a SSD), an optical storage medium (e.g., a CD or DVD), or a magnetic storage medium.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific cloud computing environment in order to provide a thorough understanding of the technique disclosed herein. It will be apparent to one skilled in the art that the technique may be practiced in other embodiments that depart from these specific details.

For example, those skilled in the art will appreciate that, although the following description of the present disclosure is provided in the context of a Kubernetes cluster, the technique of the present disclosure can be applied to other cloud management systems, apart from Kubernetes.

Further, the skilled person will appreciate that the following description describes logical components of a cloud computing system, i.e., components of a cloud computing environment, which do not necessarily have one single well-defined physical counterpart. It is rather the nature of a cloud computing environment, such as a cloud computing environment managed by Kubernetes, that logical components are assigned to one or more physical servers.

Therefore, when the description of the present disclosure states that a specific method step is carried out by a specific logical component (such as the telemetry controller), it has to be kept in mind that the respective step may be carried out in a cloud computing environment by one or more physical entities.

Figure 1:
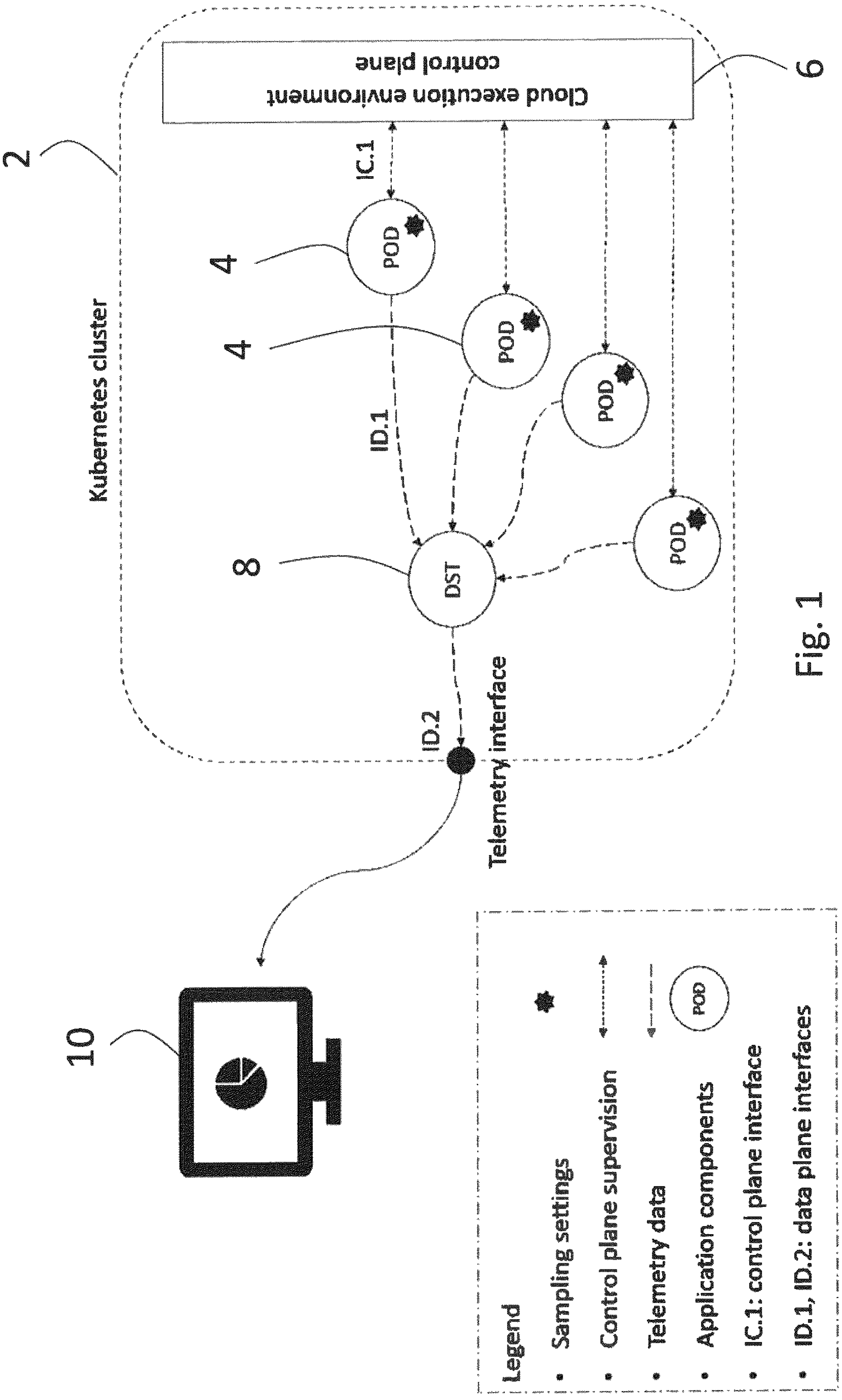
FIG. 1 shows the architecture of a Kubernetes cluster as a comparative example for a cloud computing environment.

FIG. 1 describes the essential building blocks of a cloud native application running on a Kubernetes cluster 2 and equipped with telemetry probes, according to a comparative implementation. The application is composed of a number of application components 4, the PODs 4, each consisting of running Docker containers supervised by the Kubernetes control plane 6.

The control plane 6 performs (via interface IC.1) a black box monitoring of the PODs 4, and in case a POD 4 becomes unresponsive, it is terminated by Kubernetes and a new instance is created. In other words, the POD is restarted.

Production grade applications are equipped with a telemetry subsystem 8, the DST (distributed system telemetry) item 8 in the picture that is responsible for collecting (via interface ID.1) telemetry data from the PODs 4, storing and indexing it, making it available (via interface ID.2) for retrieval by means of a telemetry interface ID.2. External clients (e.g. web browsers) can use the telemetry interface ID.2 to browse and drill into the data.

Figure 2:
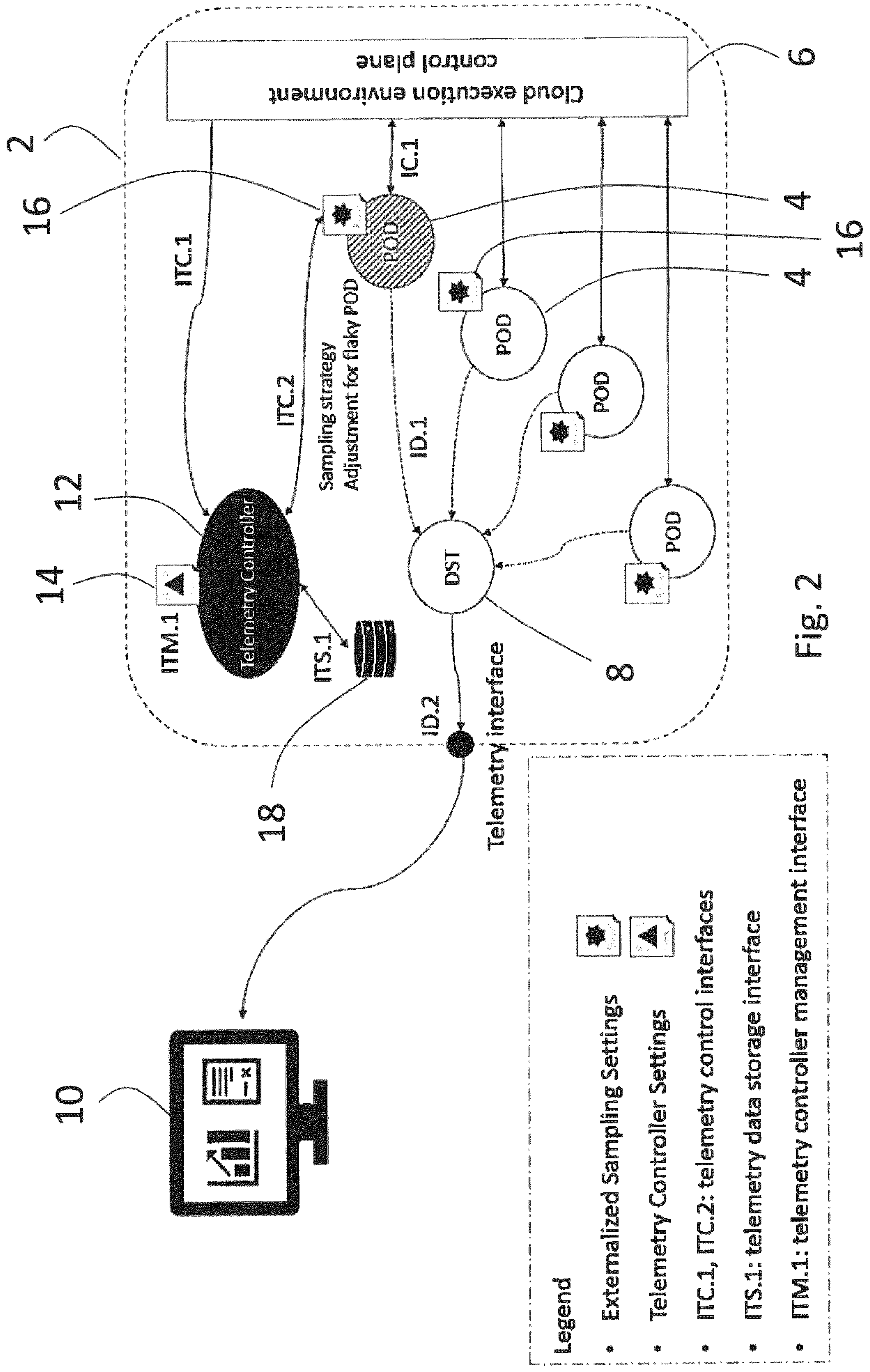
FIG. 2 shows an embodiment of the present disclosure, where a telemetry controller and a plurality of new interfaces are provided in a cloud computing environment.

In addition to the components shown in FIG. 1 and described above, the Kubernetes cluster 2 can comprise the usual Kubernetes components know to the person skilled in the art, which do not have to be described herein in further detail. It is further noted that the above description of FIG. 1 also forms the basis for the technique of the present disclosure. More precisely, the discussion of FIG. 2 is based on the above description of FIG. 1 and the above description of the components of FIG. 1 also applies to FIG. 2.

The essence of the solution of the following embodiments may be described to comprise one or more of the following aspects, without limitation:

- The adaptation of the monitoring of cloud applications in response to frequent failures.
- The usage of the monitoring information to autonomously decide what application components need a greater amount of data to be exposed to telemetry, in support of troubleshooting and identification of failure root causes.
- The ability to reuse the existing telemetry infrastructure to retrieve the additional data collected for troubleshooting.

A general idea implemented by embodiments of the present application may be described as leveraging the telemetry infrastructure to adaptively increase the observability of parts of the cloud applications that experience recurring failures over a configurable period of time.

In order to achieve this purpose, the telemetry infrastructure of a Kubernetes cluster can be extended with two assets:

- A monitoring agent (in the following also referred to as telemetry controller), to detect flaky application components (i.e., unstable PODs).
- A set of interfaces (in the following also referred to as interfaces ITC.1, ITC.2, ITS.1, and ITM.1) to externalize the control of the granularity with which telemetry data are collected.

Whenever a component in the application is reported to incur unexpected failures or other misbehavior, the monitoring agent can use the new interfaces to increase the sampling to a configurable level and for a configurable time window.

The additional data can then be accessed and inspected with the existing telemetry reporting infrastructure (in particular, via the ID.2 interface), by an external client 10.

FIG. 2 shows an architecture of a Kubernetes cluster 2 according to an embodiment of the present disclosure. The solution, starting from the existing layout (see FIG. 1 and the above description), adds some functional blocks to dynamically control the need of finer sampling of telemetry data whenever an application component 4 (i.e., a POD 4) exhibits instability.

A new application component "Telemetry Controller" 12 is added to the system, and four new interfaces (ITC.1, ITC.2, ITS.1, and ITM.1) are identified for the essential exchange of control information between it and the other parts of the system.

Interface ITC.1 is used by the Telemetry Controller 12 to retrieve from the control plane 6 the events related to the other application PODs 4; events that signal POD misbehavior (in particular, restarts) are stored in a local storage 18 via interface ITS.1 for later processing.

Whenever new restart events are detected, the Telemetry Controller 12 queries its local storage 18 to detect if any POD 4 has restarted with a frequency greater than the tolerance configured (so called flaky PODs 4) in the "Telemetry Control Settings" table 14 (implemented by a Kubernetes ConfigMap object, so that it is easily accessible and editable).

When flaky PODs 4 are detected, the Telemetry Controller 12 enters in action to modify the sampling frequency of telemetry data for that specific POD 4; this is done over the ITC.2 interface, through which the Telemetry Controller 12 sets suitable values in an Externalized Sampling Settings ConfigMap 16 of the POD 4 of interest. What the "suitable values" should be is configured in the Telemetry Control Settings 14 via the ITM.1 interface (a ConfigMap). Application PODs 4 may implement the ITC.2 interface by 1) externalizing their sampling settings in a ConfigMap 16.
2) listening for changes in the setting 16 and change the collection of telemetry data accordingly.

After a configurable amount of time (again, taken from the Telemetry Control Settings 14), the sampling settings 16 for the flaky POD 4 are re-set to their previous value.

All the data gathered can then be inspected at any time via the Telemetry Interface ID.2.

The logic of the solution is implemented within the Telemetry Controller 12, and actioned via the interfaces it uses:

- ITC.1: for retrieval of relevant POD events from Kubernetes control plane 6
- ITC.2: for changes to the telemetry setting 16 of PODs 4
- ITS.1: for a) storage and b) retrieval of saved information of PODs 4 restarts and configuration to and from a storage 18
- ITM.1: for configuration of the key parameters used by the Telemetry Controller 12.

Figure 3:
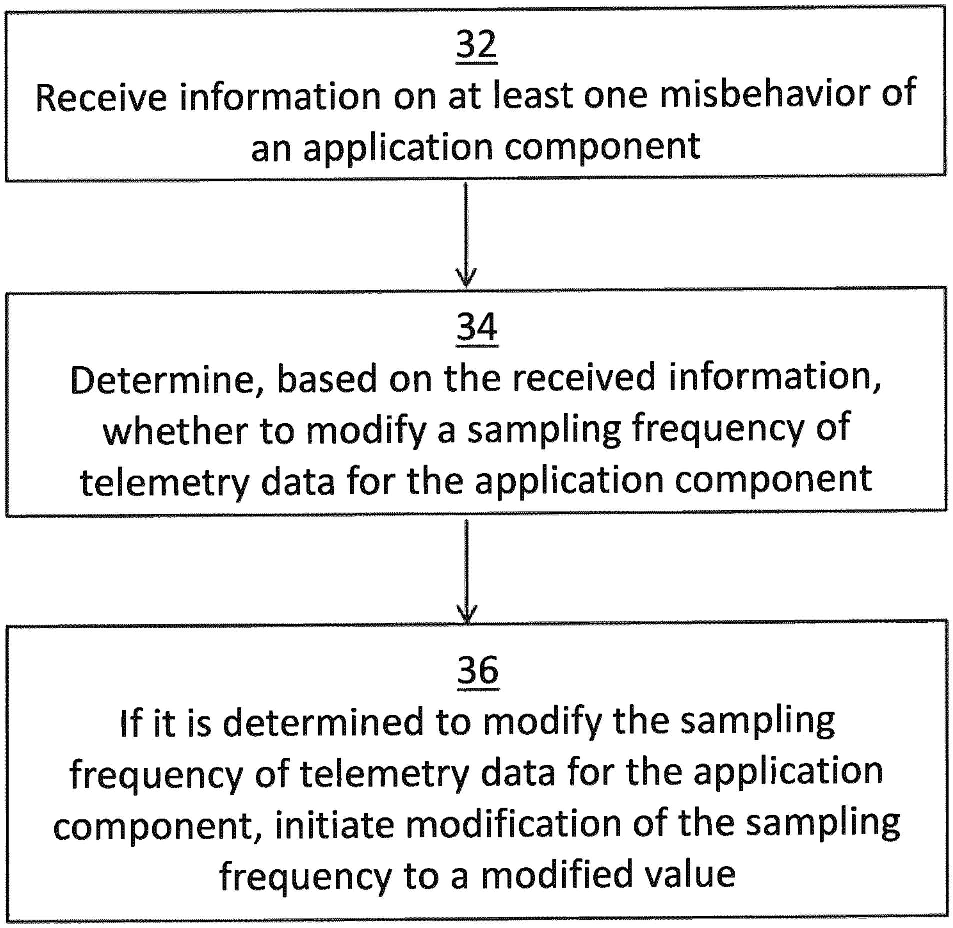
FIG. 3 shows a flow chart of a method according to the present disclosure.

FIG. 3 shows a flow chart of a method for adapting telemetry settings in a cloud computing environment. According to an embodiment, the method is carried out by the telemetry controller 12 shown in FIG. 2.

According to a first step 32, the telemetry controller 12 receives information on at least one misbehavior of an application component 4. The misbehavior may correspond to a restart and the application component 4 may be a Kubernetes POD 4, e.g., one of the PODs 4 shown in FIG. 2. The information is received from the control plane 6 via the ITC.1 interface. The control plane 6 has received information on the misbehaviors of the PODs 4, since it monitors the PODs 4 via the IC.1 interface.

According to a second step 34, the telemetry controller 12 determines, based on the received information, whether to modify a sampling frequency of telemetry data for the application component 4. The decision may be made on the basis of a determination whether an amount of misbehaviors within a predetermined time window (and, therefore, a frequency of misbehaviors) is above a predefined threshold value.

According to a third step 36, if it is determined in step 34 to modify the sampling frequency of telemetry data for the application component, the telemetry controller 12 initiates modification of the sampling frequency to a modified value. The modification may be carried out via the ITC.2 interface, wherein a new (modified) value for the sampling frequency may be written into the sampling settings 16 and/or activated in the sampling settings 16 of the respective POD 4. The modified value may indicate a higher sampling frequency than a previous value used as a sampling frequency for performing telemetry on the respective POD 4.

Figure 4:
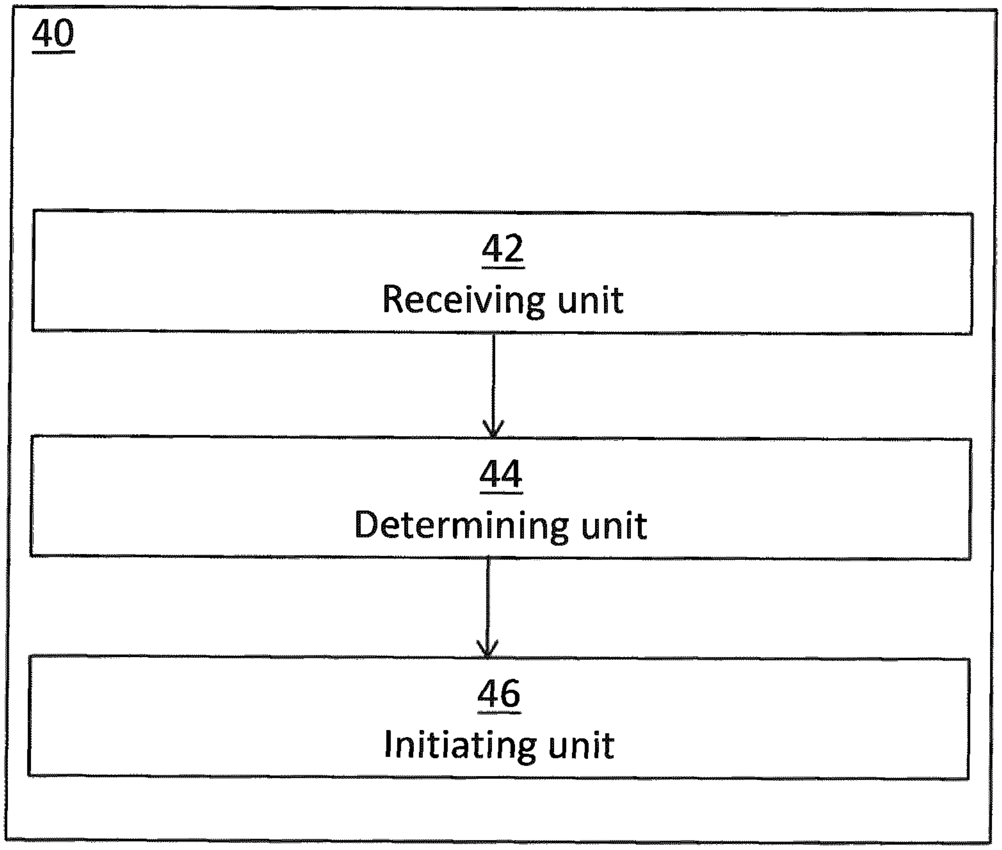
FIG. 4 shows a schematic representation of a cloud computing entity according to the present disclosure.

FIG. 4 shows a schematic representation of a cloud computing entity 40 for adapting telemetry settings in a cloud computing environment. The cloud computing entity 40 is hosting a telemetry controller 12, e.g., the telemetry controller 12 shown in FIG. 2. The cloud computing entity 40 is a logical device that may be located on one or more (distributed) physical entities, such as physical servers.

The cloud computing entity 40 comprises a receiving unit 42, a determining unit 44, and an initiating unit 46. Each of these units 42, 44, and 46 represents a logical unit that may be embodied in the form of software and/or hardware and that may be running on one or more physical entities, e.g., physical servers. The receiving unit 42 is configured to carry out step 32 of FIG. 3 discussed above. The determining unit 44 is configured to carry out step 34 of FIG. 3 discussed above. The initiating unit 46 is configured to carry out step 36 of FIG. 3 discussed above.

Figure 5:
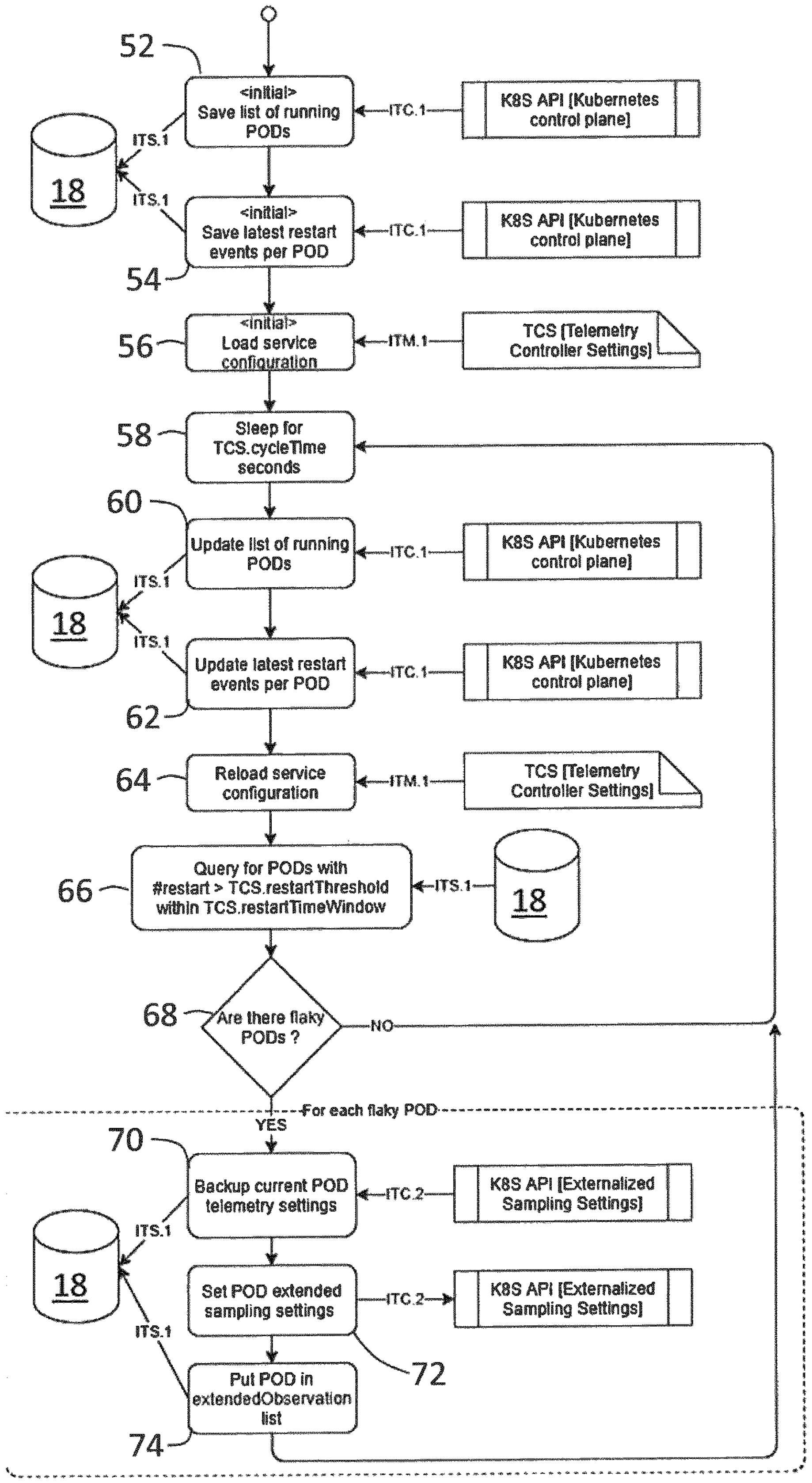
FIG. 5 shows a flow chart of identifying troublesome PODs according to the present disclosure.

The flow chart of FIG. 5 implements the task of identifying troublesome (also referred to as "flaky" or "instable") PODs 4 and puts them under "extended observation", that is, increased data collection via telemetry. The method of FIG. 5 may be regarded as a more detailed representation of the method of FIG. 3. The method of FIG. 5 is carried out by the telemetry controller 12. The steps 52 to 74 described in the following are carried out in the indicated order.

In a first initial step 52, a list of the running PODs 4 of the respective cloud computing environment is saved to storage 18 via interface ITS.1. The required information is received from the Kubernetes control plane 6 (also referred to as K8S API in FIG. 5) via interface ITC.1. In a step 54, (initial step), information on the latest restart events per POD 4 is saved to the storage 18 via the interface ITS.1. Again, the required information for performing step 54 is received from the control plane 6. In a step 56 (initial step), a service configuration is loaded from the telemetry controller settings 14 via interface ITM.1.

In a step 58, the telemetry controller 12 sleeps for an amount of time set by a parameter TCS.cycleTime (in seconds), also referred to herein as cycleTimeSeconds. In a step 60, the list of running PODs is updated and stored in storage 18 via interface ITS.1. The required information is received via interface ITC.1 from the control plane 6. In a step 62, the latest restart events per POD 4 are updated and stored in storage 18 via interface ITS.1. The information required for this step is received from the control plane 6 via interface ITC.1.

In a step 64, the service configuration is reloaded via interface ITM.1 from the telemetry controller settings 14. In a step 66, it is queried for PODs 4 with a number of restarts (#restart) larger than a predefined threshold value (TCS.restartThreshold, also referred to as restartThreshold) in a predetermined time window (TCS.restartTimeWindow, also referred to as restartTimeWindow). In other words, it is checked whether #restart>TCS.restartThreshold within TCS.restartTimeWindow. Thereby, it is determined whether a frequency of misbehavior of the application component 4 (POD 4) is above a predefined threshold value. The information on the number of restarts is received from the storage 18 via interface ITS.1.

In a step 68 it is determined, based on the query of step 66, if there are flaky PODs 4. The expression "flaky PODs" is defined herein as PODs, for which the equation of step 66 is true, i.e., PODs 4, which have a number of restarts in a given time window larger than a predefined threshold value. In case there are no flaky pods ("NO" in FIG. 5), the method returns to step 58. In case, there is at least one flaky POD 4 ("YES" in FIG. 5), the following steps 70 to 74 are carried out for each flaky POD identified at steps 66 and 68.

In a step 70, the current POD telemetry settings are received from the telemetry settings 16 of the respective flaky POD 4 via interface ITC.2 and backed up in the storage 18 via interface ITS.1.

In a step 72, extended sampling settings are set in the respective flaky POD 4. More precisely, extended samplings settings are stored in the telemetry settings 16 of the flaky POD 4 via interface ITC.2. In other words, the sampling frequency of the respective POD 4 is modified to a modified value (e.g., increased).

In a step 74, the respective POD 4 is put in an extended observation list, extendedObservation list, which is stored in storage 18 via interface ITS.1.

Figure 6:
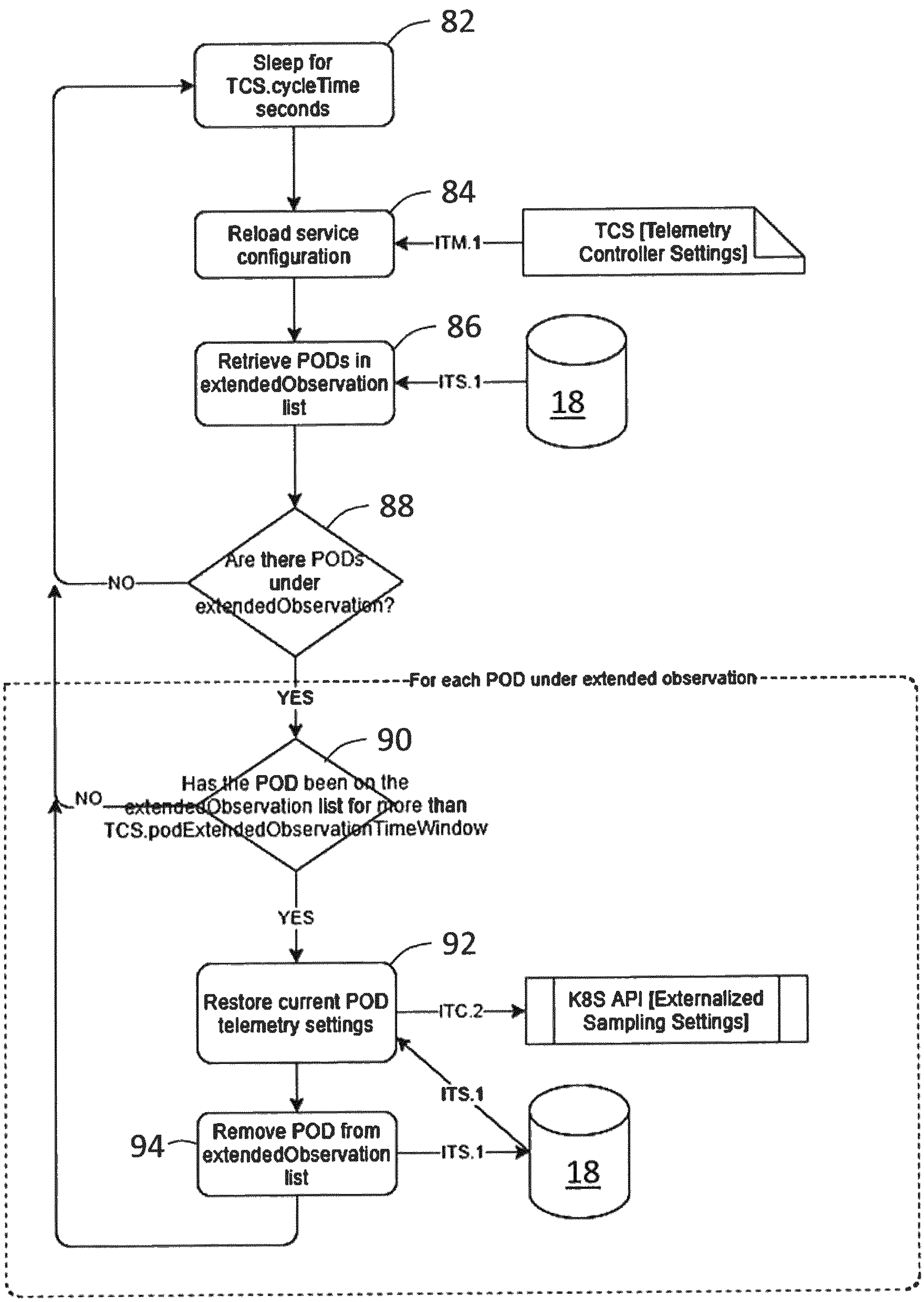
FIG. 6 shows a flow chart of resetting observation of the troublesome PODs to normal operation after a predefined amount of time.

The flow chart of FIG. 6 takes care of the monitoring of PODs under extended observation, so that, when their extended observation time window expires, the PODs are re-set to their normal operation. The method of FIG. 6 is carried out by the telemetry controller 12. The steps 82 to 94 described in the following are carried out in the indicated order.

In a first step 82, the telemetry controller 12 sleeps for an amount of time set by the parameter TCS.cycleTime (in seconds), also referred to herein as cycleTimeSeconds. In a step 84, the service configuration is reloaded from the telemetry controller settings 14 via interface ITM.1. In a step 86, the PODs 4 in the extendedObservation list are retrieved from storage 18 via interface ITS.1. In a step 88, it is determined, based on the result of step 86, if there are PODs 4 under extendedObservation. In other words, it is determined in steps 86 and 88, which of the PODs 4 of the Kubernetes cluster are under extended observation, if any.

If it is determined that there are no PODs 4 under extended observation ("NO" at step 88 in FIG. 6), the method returns to step 82. If it is determined that there is at least one POD 4 under extended observation ("YES" at step 88 in FIG. 6), the method performs the following steps 90 to 94 for each one of the PODs 4 under extended observation.

In a step 90, it is determined whether the POD 4 (i.e., the POD 4 in the extendedObservation list) has been on the extendedObservation list for more than a predefined amount of time, represented by a parameter TCS.podExtendedObservationTimeWindow (also referred to herein as podExtendedObservationTimeWindow). If this is not the case ("NO" at step 90 in FIG. 6), the method returns to step 88. If it is determined in step 90 that the POD has been on the extendedObservation list for more than the predefined amount of time ("YES" at step 90 in FIG. 6), the current POD telemetry settings are restored by loading a previous value of the POD telemetry settings (the one backed up in step 70) from the storage 18 via interface ITS.1. This previous value is stored in the telemetry settings 16 of the respective POD via interface ITC.2. In other words, a modification of the sampling frequency (i.e., sampling frequency of telemetry data) is initiated, back to a previous value.

In a step 94, the respective POD 4 is removed from the extendedObservation list. The extendedObservation list is stored in storage 18 and updated via interface ITS.1.

Note that the name of the data structures and fields used in the present disclosure is purely indicative and can be changed by an implementer without affecting the generality and novelty of the technique described herein. This applies, in particular, to the names of the parameters used in the settings tables discussed in the following.

In the following, an example of the telemetry controller settings 14 is given. The telemetry controller settings 14 are accessed by the telemetry controller 12 via interface ITM.1.

According to an embodiment, the telemetry controller settings 14 are represented by a Kubernetes ConfigMap object. The following snippet shows an example of the telemetry controller settings 14 in the form of a Kubernetes ConfigMap object (configuration object).

```
apiVersion: v1
kind: ConfigMap
metadata:
  name: telemetry-control-settings-cm
labels:
  name: telemetry-control-settings-cm
data:
  cycleTimeSeconds: 300 ## Telemetry Control awakes every
cycleTimeSeconds
  restartThreshold:   3 ## a POD is candidate for extended
observation if it restarts
      ## too many times in a given period
  restartTimeWindow: 60 ## a POD is elected for extended
observation if it restarts more than
      ## restartThreshold times within a
restartTimeWindow period [in minutes]
  podExtendedObservationTimeWindow: 30 ## a POD undergoes
extended observation for [in minutes]
  traceSamplingUnderExtendedObservation: 1.00 ## we want 100%
of traces to be collected
  loggingSamplingUnderExtendedObservation: "DEBUG" ## we
want logging at "DEBUG" level
```

In view of the above, the configuration object comprises:

1) a time value indicating a periodicity of wakeup events of a telemetry control process: cycleTimeSeconds set to 300 s in the above example;
2) a restart threshold indicating a threshold value for a number of times the application component may restart within a predefined time window without initiating modification of the sampling frequency: restartThreshold set to 3 in the above example;
3) a value indicating a duration of the time window: restartTimeWindow set to 60 min in the above example;
4) a value indicating a predefined amount of time after initiating the modification of the sampling frequency before initiating a modification of the sampling frequency back to a previous value: podExtendedObservationTimeWindow set to 30 min in the above example;
5) the modified value of the sampling frequency: traceSamplingUnderExtendedObservation set to 1 (=100%) in the above example;
6) a value indicating a level of logging: loggingSamplingUnderExtendedObservation set to "DEBUG" in the above example, indicating that it shall be logged at "DEBUG" level.

In the following, an example of the externalized sampling settings 16 is given. The sampling settings 16 are accessed by the telemetry controller 12 via interface ITC.2. According to an embodiment, the sampling settings 16 are modelled with a Kubernetes ConfigMap object. The sampling settings 16 are mounted as volumeMount by all application PODs 4.

The following snippet shows an example of the sampling settings 16 of a POD 16 in the form of a Kubernetes ConfigMap object (configuration object).

```
  apiVersion: v1
  kind: ConfigMap
  metadata:
    name: externalized-sampling-settings-cm
  labels :
```

-continued

```
  name: externalized-sampling-settings-cm
data:
  tracingSampling:   0.002      ## under normal operations we
want 0.2% of traces sampled
  loggingSampling:  "WARNING" ## under normal operations we
want logging at WARNING and above
```

In view of the above, the sampling settings 16 comprise a current value to which the sampling frequency is set: tracingSampling set to 0.002 (=0.2%) in the above example. The above example therefore shows a case, in which the sampling frequency is set to a standard value, i.e., a previous value to which the sampling frequency is set after the predefined amount of time. As shown in the above example of telemetry controller settings 14, this value will be set to 1 in case the respective POD 4 is in the extendedObservation list.

Further, the sampling settings 16 comprise a value indicating a level of logging: loggingSampling set to "WARNING" in the above example, indicating that logging is performed at "WARNING" level and above. In case the respective POD 4 would be in the extendedObservation list, this value (loggingSampling) would be set to "DEBUG", according to the above example of telemetry controller settings 14.

As described above, the telemetry controller 12 presented in the embodiments uses the following interfaces:

- an interface ITC.1 for the receiving of the information on at least one misbehavior of the application component 4 from a control plane 6 of the cloud computing environment;
- an interface ITC.2 for the initiating of the modification of the sampling frequency of telemetry data for the application component 4;
- an interface ITS.1 for storage and retrieval of saved information of restarts and/or configuration of at least one application component 4; and
- an interface ITM.1 for configuration of key parameters used by the telemetry controller 12.

At least some of the embodiments may result in one or more of the following advantages. The automated collection of data is achieved with greater level of detail for flaky components of the cloud application. The restoration of lesser invasive telemetry can be triggered when sufficient data has been collected. Computing resources can be preserved by keeping the telemetry collection at lightweight levels when there is no actual reason to sample at higher frequency. The additional troubleshooting data can be presented via the same reporting mechanism used for statistical data reporting.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the embodiments can be varied in many ways, it will be recognized that the present disclosure should be limited only by the scope of the following claims.

The invention claimed is:

1. A method for adapting telemetry settings in a cloud computing environment, the method being carried out by a telemetry controller within the cloud computing environment and the method comprising:

receiving information on at least one misbehavior of an application component, the misbehavior of the application component corresponding to a restart of the application component;

determining, based on the received information, whether to modify a sampling frequency of telemetry data for the application component, the determining comprising determining whether a frequency of misbehavior of the application component is above a predefined threshold value, the predefined threshold being derived from a configuration object, the configuration object comprising a restart threshold indicating a threshold value for a number of times the application component may restart within a predefined time window without initiating modification of the sampling frequency; and if it is determined to modify the sampling frequency of telemetry data for the application component, initiating modification of the sampling frequency to a modified value.

2. The method of claim 1, wherein the information on at least one misbehavior is received from a control plane of the cloud computing environment.

3. The method of claim 1, wherein the cloud computing environment comprises a Kubernetes cluster.

4. The method of claim 3, wherein the step of initiating modification of the sampling frequency of telemetry data for the application component comprises initiating an adaption of a value stored in a Kubernetes ConfigMap object assigned to the application component.

5. The method of claim 1, further comprising:

after a predefined amount of time after initiating the modification of the sampling frequency, initiating a modification of the sampling frequency back to a previous value.

6. The method of claim 1, wherein the configuration object further comprises at least one of:

a time value indicating a periodicity of wakeup events of a telemetry control process;

a value indicating a duration of the time window;

a value indicating a predefined amount of time after initiating the modification of the sampling frequency before initiating a modification of the sampling frequency back to a previous value;

the modified value of the sampling frequency; and a value indicating a level of logging.

7. The method of claim 6, wherein the configuration object is a Kubernetes ConfigMap object.

8. The method of claim 1, wherein the telemetry controller uses at least one of the following interfaces:

an interface for the receiving of the information on at least one misbehavior of the application component from a control plane of the cloud computing environment;

an interface for the initiating of the modification of the sampling frequency of telemetry data for the application component;

an interface for storage and retrieval of saved information of restarts and/or configuration of at least one application component; and an interface for configuration of key parameters used by the telemetry controller.

9. A method for processing telemetry data in a cloud computing environment, the method comprising:

a method carried out by a telemetry controller within the cloud computing environment, the method carried out by the telemetry controller comprising:

receiving information on at least one misbehavior of an application component, the misbehavior of the application component corresponding to a restart of the application component;

determining, based on the received information, whether to modify a sampling frequency of telemetry data for the application component, the determining comprising determining whether a frequency of misbehavior of the application component is above a predefined threshold value, the predefined threshold being derived from a configuration object, the configuration object comprising a restart threshold indicating a threshold value for a number of times the application component may restart within a predefined time window without initiating modification of the sampling frequency;

and if it is determined to modify the sampling frequency of telemetry data for the application component, initiating modification of the sampling frequency to a modified value;

receiving, by a telemetry subsystem of the cloud computing environment, the telemetry data of the application component, retrieved with the modified sampling frequency; and making available, by the telemetry subsystem, the telemetry data via a telemetry interface.

10. The method of claim 9, further comprising:

accessing, by an external client, the telemetry data via the telemetry interface; and determining whether the application component has suffered repeated failures.

11. A cloud computing entity for adapting telemetry settings in a cloud computing environment, the cloud computing entity hosting a telemetry controller within the cloud computing environment and the telemetry controller being configured to:

receive information on at least one misbehavior of an application component, the misbehavior of the application component corresponding to a restart of the application component;

determine, based on the received information, whether to modify a sampling frequency of telemetry data for the application component, the determining comprises determining whether a frequency of misbehavior of the application component is above a predefined threshold value, the predefined threshold being derived from a configuration object, the configuration object comprising a restart threshold indicating a threshold value for a number of times the application component may restart within a predefined time window without initiating modification of the sampling frequency; and if it is determined to modify the sampling frequency of telemetry data for the application component, initiate modification of the sampling frequency to a modified value.

12. The cloud computing entity of claim 11, wherein the telemetry controller is configured to receive the information on at least one misbehavior from a control plane of the cloud computing environment.

13. The cloud computing entity of claim 11, wherein the cloud computing environment comprises a Kubernetes cluster.

14. The cloud computing entity of claim 13, wherein the step of initiating modification of the sampling frequency of telemetry data for the application component comprises initiating an adaption of a value stored in a Kubernetes ConfigMap object assigned to the application component.

15. The cloud computing entity of claim 11, wherein the telemetry controller is further configured to:

after a predefined amount of time after initiating the modification of the sampling frequency, initiate a modification of the sampling frequency back to a previous value.

16. The cloud computing entity of claim 11, wherein the configuration object further comprises at least one of:

a time value indicating a periodicity of wakeup events of a telemetry control process;

a value indicating a duration of the time window;

a value indicating a predefined amount of time after initiating the modification of the sampling frequency before initiating a modification of the sampling frequency back to a previous value;

the modified value of the sampling frequency; and a value indicating a level of logging.

* * * * *